United States Patent
Yamanaka et al.

(10) Patent No.: US 7,201,832 B2
(45) Date of Patent: *Apr. 10, 2007

(54) ELECTRODEIONIZATION DEIONIZED WATER PRODUCING APPARATUS

(75) Inventors: Koji Yamanaka, Tokyo (JP); Hiroshi Inoue, Tokyo (JP); Naoyuki Tajima, Tokyo (JP)

(73) Assignee: Organo Corporation, Tokyo (JP)

( * ) Notice: Subject to any disclaimer, the term of this patent is extended or adjusted under 35 U.S.C. 154(b) by 734 days.

This patent is subject to a terminal disclaimer.

(21) Appl. No.: 10/422,772

(22) Filed: Apr. 25, 2003

(65) Prior Publication Data
US 2003/0213695 A1    Nov. 20, 2003

(30) Foreign Application Priority Data
May 15, 2002    (JP)    ............... 2002-140453

(51) Int. Cl.
*B01D 61/48*    (2006.01)
(52) U.S. Cl. .............. 204/524; 204/533; 204/536; 204/632; 204/633
(58) Field of Classification Search ........... 204/524, 204/533, 536, 632, 633
See application file for complete search history.

(56) References Cited

U.S. PATENT DOCUMENTS 6,274,018 B1    8/2001    Hidaka
7,033,472 B2 *    4/2006    Yamanaka et al. .......... 204/524

FOREIGN PATENT DOCUMENTS

WO    WO 98/51620    11/1998

OTHER PUBLICATIONS

Frantisek Svec, et al., "New Designs of Macroporous Polymers and Supports: From Separation to Biocatalysis", SCIENCE, vol. 273. Jul. 12, 1996, pp. 205-211.

* cited by examiner

*Primary Examiner*—Arun S. Phasge
(74) *Attorney, Agent, or Firm*—Oblon, Spivak, McClelland, Maier & Neustadt, P.C.

(57) ABSTRACT

In the electrodeionization deionized water producing apparatus, water is passed through a deionizing chamber(s) packed with an organic porous ion exchange material having a three-dimensional network structure to remove ionic impurities in the water, thereby producing deionized water. At the same time, a DC electric field is applied to the deionizing chamber(s) to discharge ionic impurities adsorbed on the organic porous ion exchange material outside the system, wherein the DC electric field is applied so that the ions to be discharged may electrophoretically move in the direction reverse to the flow of water through the organic porous ion exchange material.

17 Claims, 4 Drawing Sheets

ELECTRODEIONIZATION DEIONIZED WATER PRODUCING APPARATUS

BACKGROUND OF THE INVENTION

1. Field of the Invention

The present invention relates to an electrodeionization deionized water producing apparatus used in various industries such as the semiconductor manufacturing industry, the pharmaceutical industry, the food industry, power plants, and laboratories, as well as for the manufacture of sugar solutions, juice, wine, and the like.

2. Description of Background Art

As a method of producing deionized water, a method of passing feed water through ion exchange resins has conventionally been known. This method, however, requires regeneration of the ion exchange resins with chemicals when the ion exchange resins have been saturated with ions. To overcome this operational disadvantage, the electrodeionization deionized water production method that does not require regeneration with chemicals has been established and put into practice.

The above conventional electrodeionization deionized water producing apparatus has a basic structure of a deionizing chamber containing an ion exchange resin mixture consisting of an anion exchange resin and a cation exchange resin, packed in a space between a cation exchange membrane and an anion exchange membrane. Feed water is passed through the ion exchange resin mixture and, at the same time, a direct current is applied to the direction vertical to the flow of the water being treated via both the ion exchange membranes to electrically remove ions in the feed water into concentrate water flowing outside the both ion exchange membranes, thereby producing deionized water.

FIG. 5 shows a schematic cross-sectional view of the conventional electrodeionization deionized water producing apparatus, wherein a cation exchange membrane 101 and an anion exchange membrane 102 are alternately disposed apart from each other. A mixed ion exchange resin 103 consisting of a cation exchange resin and anion exchange resin is filled in every other space formed by the cation exchange membrane 101 and the anion exchange membrane 102, thereby forming ion depletion chambers 104. The area formed by the anion exchange membrane 102 and cation exchange membrane 101 respectively adjacent to the ion depletion chambers 104, not packed with the mixed ion exchange resin 103, serves as a concentrate chamber 105 for passing concentrate water as discussed later. A deionizing module 106 is formed by a cation exchange membrane 101, an anion exchange membrane 102, and the mixed ion exchange resin 103 packed between them. The detail is described in FIG. 6.

Specifically, the structure consists of the cation exchange membrane 101 sealingly attached to one side of a frame 107, the mixed ion exchange resin 103 packed inside the frame 107, and the anion exchange membrane 102 sealingly attached to the other side of the frame 107. Since the ion exchange membranes are comparatively soft materials, they may curve when the mixed ion exchange resin 103 is packed inside the frame 107 and the cation exchange membrane and anion exchange membrane 101 and 102 are sealingly attached to the both sides of the frame 107, resulting in an inhomogeneous packed layer. To prevent this, a plurality of ribs 108 are usually formed in the space inside the frame 107. Although not shown in FIG. 6, the frame 107 is provided with an inlet port for water to be treated in the upper part and an outlet port for treated water in the lower part.

FIG. 5 shows a plurality of such deionizing modules 106 arranged with a spacer (not shown) between them. A cathode 109 is provided on one end and an anode 110 is provided on the other end of the arranged deionizing modules 106. The space with the spacer therein forms a concentrate chamber 105. As required, a partition membrane 111 such as a cation exchange membrane, anion exchange membrane, or separating membrane with no ion exchange capabilities is provided outside the concentrate chambers 105 on both sides. The areas contacting the both electrodes 109 and 110 respectively and separated by the partition membrane 111 are respectively a cathode chamber 112 and an anode chamber 113.

Deionized water is produced using such an electrodeionization deionized water producing apparatus in the following manner. A direct current is passed between the cathode 109 and the anode 110. Feed water flows in from a feed water inlet port A, concentrate water flows in from a concentrate water inlet port B, and electrode water flows in from electrode water inlet ports C and D. Water coming in from the feed water inlet port A flows down through each ion depletion chamber 104 in the direction of the arrows shown in solid lines. Impurity ions are removed when the water passes through the packed layer of the mixed ion exchange resin 103. Deionized water is obtained from a deionized water outlet port a. Concentrate water flowing in from the concentrate water inlet port B flows down each concentrate chamber 105 in the direction shown by the dotted line arrows, accepts impurity ions coming in via the both ion exchange membranes, and is discharged from a concentrate water discharge port b as concentrate water in which the impurity ions are concentrated. The electrode water flowing in from the electrode water inlet ports C and D is discharged from the electrode water discharge ports c and d respectively. Since this operation electrically removes impurity ions in the feed water, deionized water can be continuously produced without regenerating the packed ion exchange resins by treatment with chemicals.

However, this conventional electrodeionization deionized water producing apparatus has shortcomings such as a complicated structure and high costs for raw materials, fabrication, and assembly, since the apparatus must be provided with many ion depletion chambers and concentrate chambers which require a number of frames and ion exchange membranes. Specifically, since the conventional electrodeionization deionized water producing apparatus has bead ion exchange resins filled in a deionizing chamber, the transfer of ions when excluding ions adsorbed on the ion exchange resins is slow. This requires a shortened electrophoresis distance for ions to be excluded to obtain the target quality of treated water. Therefore, the thickness of the deionizing chamber is limited to as thin as about 1 to 8 mm. To design the conventional electrodeionization deionized water producing apparatus which can process a practical amount of water with a desired quality while being subject to these restrictions, a structure, in which a number of deionizing chambers in the form of a thin plate are arranged to pass feed water in the direction of longitudinal axis of the deionizing chamber and an electric field is applied in the vertical direction to exclude ions adsorbed, must be applied.

In the conventional electrodeionization deionized water producing apparatus, spherical particles (beads) of ion exchange resin with a diameter of about 0.2 to 0.5 mm made from a styrene-divinyl benzene (DVB) copolymer with a sulfonic acid group ($R-SO_3^-H^+$) introduced as a cation exchange group and a quaternary ammonium group ($R-N^+R_1R_2R_3$) as an anion exchange group have been used as ion exchange resins to be packed in the deionizing chamber. In these ion exchange resins, current tranfer (or tranfer of ions) in ion exchange resin particles is effected at low-resistance by dint of ion exchange groups uniformly and densely dispersed in the polymer gel, whereas in the interface of ion exchange resin particles, due to a long migration distance of the ions in water and also due to a small contact area between the resin particles having the spherical form, the flow of ions is concentrated on said small contact areas. This phenomenon occurring in the interface of the resin particles leads to hindrance of the transfer of ions, and therefore a major cause of slow discharge of ions outside the system.

In addition, the conventional electrodeionization deionized water producing apparatus has a disadvantage of forming scale such as calcium carbonate and magnesium hydroxide in the concentrate chamber when feed water has a high hardness. Specifically, calcium ions and magnesium ions discharged to the concentrate chamber from the ion depletion chamber via a cation exchange membrane are locally concentrated on the surface of the anion exchange membrane on the opposite side of the concentrate chamber, in which these calcium ions and magnesium ions are mixed with carbonate ions and hydroxide ions discharged to the concentrate chamber via the anion exchange membrane in excess of the solubility product constant, thereby forming scale. If scale is formed, the electric resistance increases in the scaling, resulting in a decreased current flow. To cause the current to flow in a quantity equivalent to that observed when there is no scaling, the voltage must be increased, which in turn results in an increased power consumption. In addition, the current density may vary according to the scaled area in the concentrate chamber, which leads to a non-uniform current in the deionizing chamber. If the amount of scaling increases further, the pressure difference of flow increases and the voltage is further augmented. The current decreases when the voltage exceeds the maximum voltage for the apparatus. In this instance, the current necessary for removing (excluding) ions does not flow, thereby giving rise to a decrease in the quality of treated water. In addition, grown scaling invades the inside of the ion exchange membrane and ultimately breaks the ion exchange membrane.

To prevent the scale formation, in the conventional electrodeionization deionized water producing apparatus hardness components such as calcium ions and magnesium ions are removed from feed water before introducing it to the electrodeionization deionized water producing apparatus. Specifically, the conventional electrodeionization deionized water producing apparatus required softening by replacing the hard components with sodium ions by causing the feed water to pass through a Na-type cation exchange resin layer or primary desalting treatment using a reverse osmotic membrane or ion exchange membranes.

Accordingly, an object of the present invention is to provide an electrodeionization deionized water producing apparatus ensuring easy removal of ions adsorbed on the ion exchange resins by accelerating the movement of adsorbed ionic impurities, capable of decreasing the costs of raw materials, fabrication, and assembly by simplifying the structure of the apparatus, and entirely free from scale formation such as calcium carbonate and magnesium hydroxide, thereby eliminating the necessity of pretreatments such as primary desalting and softening.

SUMMARY OF THE INVENTION

Such being the case, the inventors of the present invention have conducted extensive studies with an objective of remedying the above shortcomings to the conventional electrodeionization deionized water producing apparatus. As a result, the inventors have found that, if an organic porous ion exchange material with a three-dimensional network structure is used as a filler for deionizing chambers and an electric field is applied to cause ions to move by electrophoresis in the direction reverse to the flow of water in the ion exchange material and to be discharged, not only can the structure of the electrodeionization deionized water producing apparatus be simplified so that the costs for raw materials, fabrication, and assembly can be decreased, but also the apparatus is made entirely free from scale formation such as calcium carbonate and magnesium hydroxide, thereby eliminating the necessity of pretreatments such as primary desalting and softening.

Specifically, a first object of the present invention is to provide an electrodeionization deionized water producing apparatus having a deionizing chamber packed with an organic porous ion exchange material having a continuous pore structure comprising interconnecting macropores and mesopores with a median diameter of 1 to 1000 μm existing on the walls of the macropores, the organic porous ion exchange material having a total pore volume of 1 to 50 ml/g, uniformly distributed ion exchange groups, and an ion exchange capacity of 0.5 meq./g or more on a dry basis, wherein deionized water is produced by eliminating ionic impurities in feed water by passing the feed water through the deionizing chamber and, at the same time, the ionic impurities adsorbed on the organic porous ion exchange material are discharged outside the system by applying a DC electric field to the deionizing chamber, the electrodeionization deionized water producing apparatus being characterized by applying the DC electric field so that the ions to be discharged electrophoretically move in the direction reverse to the flow of water through the organic porous ion exchange material. A second object of the present invention is to provide an electrodeionization deionized water producing apparatus comprising: an electrodeionization decationized water-producing apparatus comprising a decationizing chamber packed with an organic porous cation exchange material in a deionizing chamber partitioned by an ion exchange membrane on one side and a cation exchange membrane on the other side, an anode disposed outside the ion exchange membrane on the one side, a cathode disposed outside the cation exchange membrane on the other side, a first feed water introduction-distribution section disposed in the neighborhood of the cation exchange membrane on the other side in the decationizing chamber, and a first treated water collecting section disposed in the neighborhood of the ion exchange membrane on the one side in the decationizing chamber; and an electrodeionization deanionized water-producing apparatus comprising a deanionizing chamber packed with an organic porous anion exchange material in a deionizing chamber partitioned by an anion exchange membrane on one side and an ion exchange membrane on the other side, an anode disposed outside the anion exchange membrane on the one side, a cathode disposed outside the ion exchange membrane on the other side, a second feed water introduction-distribution section disposed in the neighborhood of the anion exchange membrane on the one side in the deanionizing chamber connected via a connection tube with the first treated water collecting section of the electrodeionization decationized water-producing apparatus, and a second treated water collecting section disposed in the neighborhood of the ion exchange membrane on the other side in the deanionizing chamber. A third object of the present invention is to provide an electrodeionization deionized water producing apparatus comprising: a decationizing chamber packed with an organic porous cation exchange material in a first deionizing chamber partitioned by a cation exchange membrane on one side and an intermediate cation exchange membrane formed between the cation exchange membrane on one side and an anion exchange membrane on the other side, a deanionizing chamber packed with an organic porous anion exchange material in a second deionizing chamber partitioned by the said anion exchange membrane on the other side and the said intermediate cation exchange membrane, a cathode disposed outside the said cation exchange membrane on the one side, an anode disposed outside the anion exchange membrane on the other side, a first feed water introduction-distribution section disposed in the neighborhood of the said cation exchange membrane on the one side in the decationizing chamber, a first treated water collecting section disposed in the neighborhood of the intermediate cation exchange membrane in the decationizing chamber, a second feed water introduction-distribution section disposed in the neighborhood of the anion exchange membrane on the other side in the deanionizing chamber connected via a connection tube with the first treated water collecting section, and a second treated water collecting section disposed in the neighborhood of the intermediate cation exchange membrane in the deanionizing chamber. A fourth object of the present invention is to provide an electrodeionization deionized water producing apparatus comprising: a decationizing chamber packed with an organic porous cation exchange material in a first deionizing chamber partitioned by an ion exchange membrane on one side and an intermediate cation exchange membrane disposed between the ion exchange membrane on the one side and an ion exchange membrane on the other side, a concentrate chamber partitioned by the intermediate cation exchange membrane and an intermediate anion exchange membrane disposed between the intermediate cation exchange membrane and the ion exchange membrane on the other side, a deanionizing chamber packed with an organic porous anion exchange material in a second deionizing chamber partitioned by the ion exchange membrane on the other side and the intermediate anion exchange membrane, an anode disposed outside the ion exchange membrane on the one side, a cathode disposed outside the ion exchange membrane on the other side, a first feed water introduction-distribution section disposed in the neighborhood of the intermediate cation exchange membrane in the decationizing chamber, a first treated water collecting section disposed in the neighborhood of the ion exchange membrane on the one side in the decationizing chamber, a second feed water introduction-distribution section disposed in the neighborhood of the intermediate anion exchange membrane in the deanionizing chamber connected via a connection tube with the first treated water collecting section, and a second treated water collecting section disposed in the neighborhood of the ion exchange membrane on the other side in the deanionizing chamber. A fifth object of the present invention is to provide an electrodeionization deionized water producing apparatus, wherein said organic porous cation exchange material or organic porous anion exchange material has a continuous pore structure, which comprises interconnected macropores and mesopores with a median diameter of 1 to 1,000 µm existing on the walls of the macropores and has a total pore volume of 1 to 50 ml/g, uniformly distributed ion exchange groups, and an ion exchange capacity of 0.5 meq./g or more on a dry basis.

Fast transfer of ions in the porous ion exchange material can be ensured and adsorbed ions can be easily removed by using the electrodeionization deionized water producing apparatus of the present invention. In addition, since it is unnecessary to arrange a number of divided ion depletion chambers in series, the structure of the apparatus can be simplified, resulting in decreased costs for raw materials, fabrication, and assembly. Furthermore, since scaling such as calcium carbonate or magnesium hydroxide is not formed, pretreatments such as primary desalting or softening is unnecessary. Moreover, the electrodeionization deionized water producing apparatus of the present invention can constantly produce treated water with a stable quality at a low voltage.

DETAILED DESCRIPTION OF THE INVENTION

Figure 1:
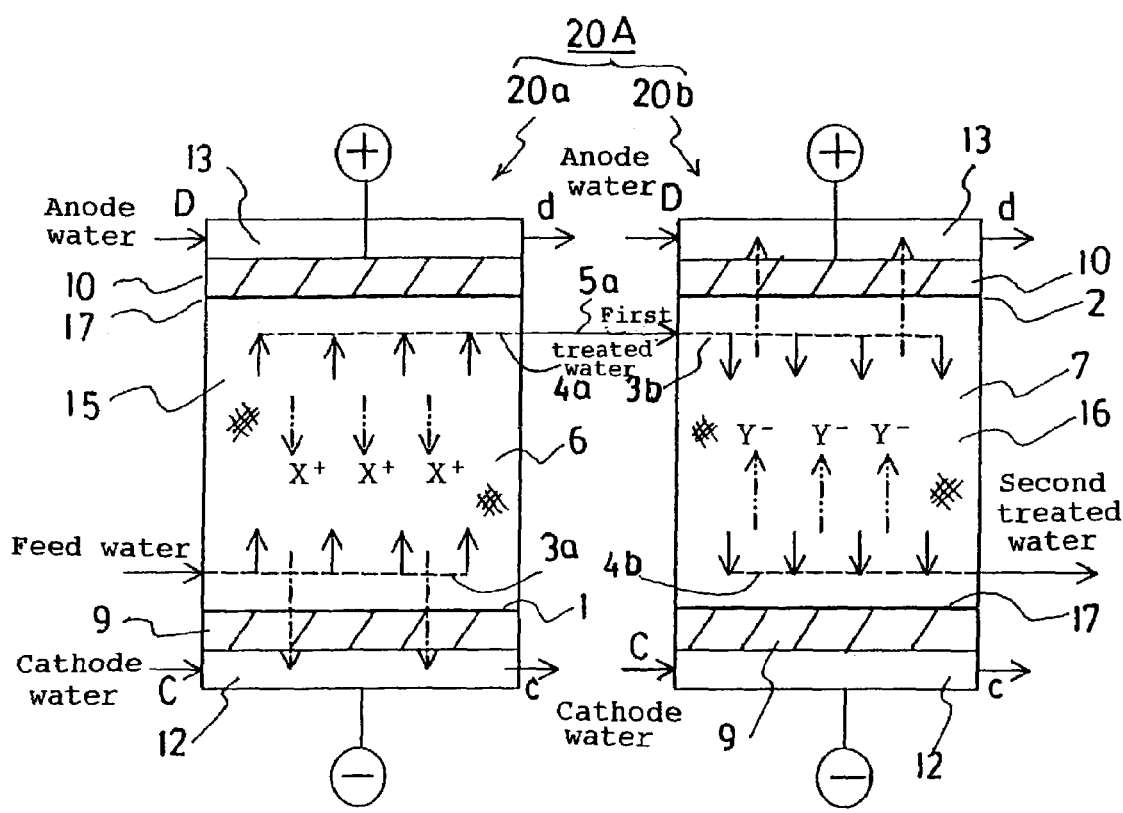
FIG. 1 is a schematic drawing showing a first embodiment of the electrodeionization deionized water producing apparatus of the present invention.

In the electrodeionization deionized water producing apparatus of the present invention, water is passed through a deionizing chamber packed with an organic porous ion exchange material having a specific structure to remove ionic impurities in the water, thereby producing deionized water. At the same time, a DC electric field is applied to the deionizing chamber to discharge ionic impurities adsorbed on the organic porous ion exchange material outside the system, wherein the DC electric field is applied so that the ions to be discharged may be electrophoretically moved in the direction reverse to the flow of water through the organic porous ion exchange material. Specifically, the electrodeionization deionized water producing apparatus of the present invention has a basic structure, in which a deionizing chamber partitioned by ion exchange membranes on both sides is packed with an organic porous ion exchange material, electrodes are disposed outside the ion exchange membranes to apply a DC electric field in the above-mentioned specific manner. The direction of the water flow through the organic porous ion exchange material in the present invention indicates the direction of the water flow in the organic porous ion exchange material having a specific continuous pore structure, specifically, the average diffusion direction of ions originating from the water flow direction in the organic porous ion exchange material having a specific continuous pore structure. This direction of water flow does not refer to the direction of water flow in the first and second feed water introduction-distribution sections and the first and second treated water collecting sections which are separately provided in the organic porous ion exchange material.

The organic porous ion exchange material packed in the deionizing chamber has a three-dimensional network structure, which has a continuous pore structure comprising interconnected macropores and mesopores having on their walls a median diameter of 1 to 1,000 µm a total pore volume of 1 to 50 ml/g, uniformly distributed ion exchange groups, and an ion exchange capacity of 0.5 meq./g or more on a dry basis.

The basic structure of the organic porous ion exchange material is a continuous pore structure which comprises interconnected macropores and mesopores with a median diameter of 1 to 1,000 µm, preferably 10 to 100 µm, existing on the walls of the interconnected macropores. Specifically, the continuous pore structure usually includes a structure in which macropores with a median diameter of 2 to 5,000 µm are layered. The layered section has mesopores functioning as common openings, most of the mesopores having an open pore structure. In the open pore structure, pores formed from the macropores and mesopores become flowing paths for water. If the median diameter of mesopores is less than 1 µm, a pressure loss during water permeation is too great. The median diameter of mesopores more than 1,000 µm, on the other hand, results in difficulty in forming uniform flowing paths of water. The porous ion exchange material with the above continuous pore structure can remarkably increase the pore volume and specific surface area.

In addition, the organic porous ion exchange material has a total pore volume of 1 to 50 ml/g. If the total pore volume is less than 1 ml/g, the amount of water permeating through a unit sectional area becomes small, allowing only limited permeation of water. On the other hand, a total pore volume of more than 50 ml/g leads to a decrease in the proportion occupied by the matrix of the polymer and the like, resulting reduced strength. The material for the matrix forming the continuous pore structure is an organic polymer material having chemical restraints such as a crosslinking structure and physical restraints such as crystals. When the polymer material contains a crosslinking structure, the amount of the crosslinking structural units is preferably in the range of 10 to 90 mol % of the total amount of all structural units forming the polymer material. If the amount of the crosslinking structural units is less than 10 mol %, mechanical strength is insufficient. If the amount is more than 90 mol %, it is difficult to introduce ion exchange groups, resulting in a product with an insufficient ion exchange capacity. There are no specific limitations to the type of polymer material. Examples include styrene-based polymers such as polystyrene, poly($\alpha$-methylstyrene) and poly(vinyl benzyl chloride), and crosslinked materials of these polymers; polyolefins such as polyethylene and polypropylene, as well as crosslinked materials of these polymers; poly(halogenated olefins) such as polyvinyl chloride and polytetrafluoroethylene, as well as crosslinked materials of these polymers; nitrile-based polymers such as polyacrylonitrile and crosslinked materials of these polymers; (meth)acrylic-type polymers such as poly(methyl methacrylate) and poly(ethyl acrylate), as well as crosslinked materials of these polymers; styrene-divinylbenzene copolymer, and vinyl benzyl chloride-divinylbenzene copolymer. The above polymers may be either homopolymers obtained by the polymerization of one type of monomer or copolymers obtained by the polymerization of two or more types of monomers. In addition, a blend of two or more polymers may be used. Among these organic polymers, styrene-divinylbenzene copolymer and vinyl benzyl chloride-divinylbenzene copolymer are preferable in view of ease of introduction of ion exchange groups and high mechanical strength. The continuous pore structure of the porous ion exchange material of the present invention can be observed comparatively easily by using a scanning electron microscope (SEM).

The organic porous ion exchange material used in the present invention contains uniformly dispersed ion exchange groups and has an ion exchange capacity of 0.5 meq./g or more, and preferably 2.0 meq./g or more on dry porous material. If the ion exchange capacity is less than 0.5 meq./g on dry porous material, the ion adsorption capacity is insufficient. If the distribution of ion exchange groups is not uniform, transmission of ions in the porous ion exchange material becomes non-uniform, precluding rapid discharge of adsorbed ions. The "uniform distribution of ion exchange groups" herein refers to uniformity of ion exchange group distribution in the order of µm or less. Distribution conditions of ion exchange groups can be identified comparatively easily by using an analytical technique such as electron probe micro-analysis (EPMA), secondary ion mass spectrometry (SIMS), or the like. As ion exchange groups to be introduced into the porous ion exchange material, cationic exchange groups such as a carboxylic acid group, iminodiacetic acid group, sulfonic acid group, phosphoric acid group, phosphate group, aminophosphoric acid group, and aromatic hydroxyl group; anionic exchange groups such as a quaternary ammonium group, tertiary amino group, secondary amino group, primary amino group, polyethylene imine group, tertiary sulfonium group, and phosphonium group can be cited.

As organic porous materials having continuous pores, porous materials possessing a particle aggregation-type structure have been disclosed in F. Svec, Science, 273, 205 to 211(1996) and other publications. Japanese Patent Application Laid-open Publications No. 10-216717, No. 10-192717, No. 10-192716, and No. 8-252579 disclose particle aggregation-type porous materials in which a mixture of a cation exchange resin and anion exchange resin is bound using a binder polymer. These particle aggregation-type porous materials are produced by binding organic fine particles or bead ion exchange resins, into which ion exchange groups have been previously introduced, with a binder polymer or by filling these fine particles in a specific mold and heating the particles to melt and bind, optionally introducing ion exchange groups in the binder polymer. Since these particle aggregation-type porous materials have a small pore volume and an insufficient mesopore size due to the particle aggregation-type structure, their applications to a process requiring a large flow rate under a low pressure are limited. In addition, ion exchange groups and the like are not uniformly distributed in these particle aggregation-type porous materials. Specifically, in these porous materials, ion exchange groups are not present in the binder polymer or, even if present, the structures of the polymer matrix and ion exchange groups in the binder polymer portion are different from those in the ion exchange resin. In addition, the density of the ion exchange groups in the binder polymer portion is small when compared with that in the ion exchange resin portion. Such porous structures, therefore, do not form homogeneous ion exchange material s as a whole. For this reason, the problem of non-uniform transmission of ions and electrons in packing layers is still to be solved. Electric resistance in the packing layers of the ion exchange material s has not been sufficiently reduced and adsorbed ions are not necessarily efficiently discharged.

The porous ion exchange material used in the present invention must have a sponge structure with cells open to outside. The sponge structure herein used indicates a bubble distribution-type porous material in which bubbles are dispersed in a solid as defined by Y. Takeuchi, Properties of Porous Materials and Application Technologies, pp 2 to 5, Fuji Technosystems (2000). This is quite different from the particle aggregation-type porous materials disclosed in Japanese Patent Application Laid-open Publications No. 10-216717, No. 10-192717, No. 10-192716, and No. 8-252579. The sponge structure of the porous material ensures uniform formation of the cell structure and, at the same time, remarkably increases the total pore volume and specific surface area as compared with the particle aggregation-type porous materials. In addition, since ion exchange groups and the like are uniformly distributed in the porous ion exchange material of the present invention as mentioning above, adsorbed ions can rapidly move in packed layers and the electric resistance can be maintained at a low level, which ensures stable operation of the apparatus at a low voltage.

A method of forming the porous material from the components containing ion exchange groups in one step, a method of first forming a porous material from the components not containing an ion exchange group and then introducing ion exchange groups, or the like can be cited as the method of manufacturing the above organic porous ion exchange material. One example of the method for manufacturing the organic porous ion exchange material will now be described. Specifically, the method comprises preparing a water-in-oil type emulsion by mixing an oil-soluble monomer not containing an ion exchange group, a surfactant, water, and as required, a polymerization initiator, and polymerizing the water-in-oil type emulsion to obtain a porous material. Ion exchange groups are introduced into the porous material to obtain the organic porous ion exchange material.

The oil-soluble monomer not containing an ion exchange group indicates a lipophilic monomer that does not contain an ion exchange group such as a carboxylic acid group or sulfonic acid group and has low solubility in water. Specific examples of such a monomer include styrene, α-methylstyrene, vinyl toluene, vinyl benzyl chloride, divinylbenzene, ethylene, propylene, isobutene, butadiene, isoprene, chloroprene, vinyl chloride, vinyl bromide, vinylidene chloride, tetrafluoroethylene, acrylonitrile, methacrylonitrile, vinyl acetate, methyl acrylate, ethyl acrylate, butyl acrylate, 2-ethylhexyl acrylate, trimethylolpropane triacrylate, butanediol diacrylate, methyl methacrylate, ethyl methacrylate, propyl methacrylate, butyl methacrylate, 2-ethylhexyl methacrylate, cyclohexyl methacrylate, benzyl methacrylate, glycidyl methacrylate, and ethylene glycol dimethacrylate. These monomers can be used either individually or in combination of two or more. However, to obtain the necessary mechanical strength for introducing many ion exchange groups in the later step, it is desirable to select a crosslinking monomer, such as divinylbenzene or ethylene glycol dimethacrylate, as at least one monomer component, and incorporate such a monomer in an amount of 5 to 90 mol %, preferably 10 to 80 mol % of the total amount of oil-soluble monomers.

There are no specific limitations to the types of surfactant inasmuch as a water-in-oil (w/o) type emulsion can be formed when the oil-soluble monomer not containing an ion exchange group is mixed with water. Nonionic surfactants such as sorbitan monooleate, sorbitan monolaurate, sorbitan monopalmitate, sorbitan monostearate, sorbitan trioleate, polyoxyethylene nonyl phenyl ether, polyoxyethylene stearyl ether, and polyoxyethylene sorbitan monooleate; anionic surfactants such as potassium oleate, sodium dodecylbenzene sulfonate, and dioctyl sodium sulfosuccinate; cationic surfactants such as distearyl dimethyl ammonium chloride; and amphoretic surfactants such as lauryl dimethyl betaine can be used as the surfactant. These surfactants may be used either individually or in combinations of two or more. The term "w/o-type emulsion" refers to an emulsion having a continuous oil phase in which water droplets are dispersed. Although the amount of the above surfactants to be added significantly varies according to the type of oil-soluble monomers and the size of target emulsion particles (macropores), a specific amount of the surfactant can be selected in the range of about 2% to 70% of the total amount of the oil-soluble monomers and surfactants. In addition, although not necessarily essential, alcohols such as methanol and stearyl alcohol, carboxylic acids such as stearic acid, or hydrocarbons such as octane and dodecane may be added to control the shape and size of foams of the porous ion exchange material.

A compound that generates radicals by heat or light is suitably used as the polymerization initiator. The polymerization initiator may be either water-soluble or oil-soluble. Examples include azobisisobutyronitrile, azobiscyclohexanenitrile, azobiscyclohexanecarbonitrile, benzoyl peroxide, potassium persulfate, ammonium persulfate, hydrogen peroxide-iron chloride, sodium persulfate-acidic sodium sulfite, and tetramethylthiuram disulfide. In some reaction systems, polymerization proceeds only by heat or light without the addition of a polymerization initiator. In such a case, the polymerization initiator need not be added.

In forming water-in-oil type emulsions from oil-soluble monomers not containing an ion exchange group, precipitants, surfactants, water, and polymerization initiators, there are no specific limitations to the order of mixing these components. A method of mixing these components all together; a method of separately preparing a mixture of oil-soluble components, which include oil-soluble monomers, precipitants, surfactants, and oil-soluble polymerization initiators, and a solution of aqueous components, which include water and water-soluble polymerization initiators, then mixing the mixture with the solution; and other similar methods can be used. There are also no specific limitations to the mixing apparatus for forming the emulsion. Conventional mixers, homogenizers, high-pressure homogenizers, planet-type stirrer, and the like can be used under emulsification conditions arbitrarily selected for obtaining emulsion having a target particle size.

Various polymerization conditions can be selected for polymerizing the obtained water-in-oil type emulsion according to the type of monomers and polymerization initiators. For example, when azobisisobutyronitrile, benzoyl peroxide, potassium persulfate, or the like is used as the polymerization initiator, the emulsion may be polymerized with heating at 30 to 100° C. for 1 to 48 hours in a sealed vessel under an inert gas atmosphere. When hydrogen peroxide-iron chloride, sodium persulfate-acidic sodium sulfite, or the like is used as the polymerization initiator, the emulsion may be polymerized at 0 to 30° C. for 1 to 48 hours in a sealed vessel under an inert gas atmosphere. After the polymerization, the reaction mixture is removed from the reaction vessel and, if necessary, extracted with a solvent such as isopropanol to remove unreacted monomers and surfactants, thereby yielding a porous material.

As a method for introducing ion exchange groups into the organic porous material, known methods such as a macromolecular reaction, and graft polymerization can be used without any specific limitations. For example, as methods for introducing a sulfonic acid group, a method of sulfonating an organic porous material with chlorosulfuric acid, concentrated sulfuric acid, or fuming sulfuric acid, if the organic porous material is a styrene-divinylbenzene copolymer or the like; a method of introducing a radical initiation group or chain transfer group to an organic porous material and grafting sodium styrene sulfonate or acrylamide-2-methylpropane sulfonic acid with the resulting product; and a method of introducing sulfonic acid group by functional group conversion after grafting glycidyl methacrylate with an organic porous material can be given. As examples of the method for introducing a quaternary ammonium group, a method of introducing a chloromethyl group using chloromethyl methyl ether or the like and reacting with a tertiary amine, if the organic porous material is a styrene-divinylbenzene copolymer or the like; a method of preparing an organic porous material by copolymerizing chloromethyl styrene and divinylbenzene and reacting the copolymer with a tertiary amine; a method of introducing a radical initiation group or chain transfer group to an organic porous material and grafting N,N,N-trimethylammonium ethylacrylate or N,N,N-trimethylammonium propylacrylamide with the resulting product; and a method of introducing a quaternary ammonium group by functional group conversion after grafting glycidyl methacrylate with an organic porous material can be given. As ion exchange groups to be introduced, cationic exchange groups such as a carboxylic acid group, iminodiacetic acid group, sulfonic acid group, aminophosphoric acid group, phosphoric acid group, and phosphate group; and anionic exchange groups such as a quaternary ammonium group, tertiary amino group, secondary amino group, primary amino group, polyethylene imine group, tertiary sulfonium group, and phosphonium group can be cited.

If a composite porous ion exchange material having a dense layer integrally attached to at least one side of the organic porous ion exchange material is used as the porous ion exchange material to be filled in the ion depletion chamber instead of the above organic porous ion exchange material, it is possible to omit the ion exchange membrane on the dense layer side when fabricating the electrodeionization deionized water producing apparatus. The dense layer used herein refers to a layer made from the same polymer as that forming the skeleton of the porous polymer with a function of preventing permeation of water. The composite porous ion exchange material with the denser layer can be prepared, for example, by filling the above w/o-type emulsion in a vessel, of which at least the part is made from a hydrophobic material, allowing the w/o-type emulsion to stand still in the vessel, forming a continuous membrane of the oil-soluble monomer on the surface of the hydrophobic material, and polymerizing the monomer. Another method comprises preparing a porous polymer by polymerizing the w/o-type emulsion, applying an oil-soluble monomer containing a polymerization initiator, as required, to the polymer, polymerizing the monomer to obtain a composite porous polymer, and introducing ion exchange groups in the same manner as above. It is possible to omit provision of the ion exchange membrane if a porous ion exchange material with an average mesopore diameter of less than 1 μm, and preferably less than 0.5 μm, is used in combination with the above organic porous ion exchange material as the organic porous ion exchange material to be filled in the deionizing chamber of the electrodeionization deionized water producing apparatus. The above porous ion exchange material having an average mesopore diameter of less than 1 μm, and preferably less than 0.5 μm, allows ions to pass through, but allows only an extremely small amount of water to permeate under normal operating conditions. Such a porous ion exchange material can therefore replace an ion exchange membrane.

When the conventional ion exchange material is used as an ion exchanger to be filled in the ion depletion chamber, the current (electrons and ions) is transmitted inside the ion exchange material with a low resistance via ion exchange groups that are uniformly and densely present in polymer gels. In the interface of the ion exchange material, on the other hand, the distance over which the ions elecrtophoretically move in water or over which electrons are transmitted via hydrogen bonds between water molecules is long. In addition, since the contact area between the ion exchange material s is small, the flow of ions is concentrated on the interface, hindering electron transmission, that is, causing electric resistance. This is a major cause of electric resistance derived from ion exchange material s. If the above organic porous ion exchange material is used as the filler, the filling work is simplified and the electric resistance can be reduced due to the excellent conductivity, which results in a decrease in power consumption.

In the present invention, the "feed water" can be any water inasmuch as the water is to be treated for deionization and contains little if any turbidities. Examples include industrial water and tap water with turbidity of about 1 or less.

An embodiment of the electrodeionization deionized water producing apparatus of the present invention will now be explained with reference to FIG. 1. FIG. 1 is a schematic drawing describing the structure of the electrodeionization deionized water producing apparatus of this embodiment. An electrodeionization deionized water producing apparatus 20A of FIG. 1 consists of an electric decationized water-producing apparatus 20a for removing cationic impurities from feed water and an electrodeionization deanionized water-producing apparatus 20b for removing anionic impurities from decationized water obtained from the electrodeionization decationized water-producing apparatus 20a. The electrodeionization decationized water-producing apparatus 20a comprises a decationizing chamber 6 packed with an organic porous cation exchange material 15 in an ion depletion chamber partitioned by an ion exchange membrane 17 on one side and a cation exchange membrane 1 on the other side, an anode 10 disposed outside the ion exchange membrane 17 on the one side, a cathode 9 disposed outside the cation exchange membrane 1 on the other side, a first feed water introduction-distribution section 3a disposed in the neighborhood of the cation exchange membrane 1 on the other side in the decationizing chamber 6, and a first treated water collecting section 4a disposed in the neighborhood of the ion exchange membrane 17 on the one side in the decationizing chamber 6. Specifically, the water flows in the porous cation exchange material 15 of the electrodeionization decationized water-producing apparatus 20a upwardly in the direction indicated by the solid arrows in FIG. 1.

On the other hand, an electrodeionization deanionized water-producing apparatus 20b comprises a deanionizing chamber 7 packed with an organic porous anion exchange material 16 in a deionizing chamber partitioned by an anion exchange membrane 2 on one side and an ion exchange membrane 17 on the other side, an anode 10 disposed outside the anion exchange membrane 2 on the one side, a cathode 9 disposed outside the ion exchange membrane 17 on the other side, a second feed water introduction-distribution section 3b disposed in the neighborhood of the anion exchange membrane 2 on the one side in the deanionizing chamber 7 connected via a connection tube 5a with the first treated water collecting section 4a of the electrodeionization decationized water-producing apparatus 20a, and a second treated water collecting section 4b disposed in the neighborhood of the ion exchange membrane 17 on the other side in the deanionizing chamber 7. Specifically, the water flows in the porous cation exchange material 16 of the electrodeionization deanionized water-producing apparatus 20b downwardly in the direction indicated by the solid arrows in FIG. 1.

The above organic porous cation exchange material is preferable as the organic porous ion exchange material 15 packed in the decationizing chamber 6 of the electrodeionization decationized water-producing apparatus 20a in this embodiment, whereas the above organic porous anion exchange material is preferable as the organic porous anion exchange material 16 packed in the deanionzing chamber 7 of the electrodeionization deanionized water-producing apparatus 20b. There are no specific limitations to the configuration of the decationzing chamber 6 and deanionzing chamber 7 inasmuch as an electric field can be applied to enable ions to be discharged to electrophoretically move in the direction reverse to the water flow in the porous ion exchange material. Cylinder and cuboid, for example, are preferable configurations from the viewpoint of easiness of fabrication. The distance over which the feed water moves, specifically, the effective thickness of the porous ion exchange material layers forming the decationzing chamber 6 and deanionzing chamber 7 is 20 to 600 mm, and preferably 30 to 300 mm, for ensuring the deionizing treatment while controlling the values of electric resistance and the pressure difference of water permeation. There are no specific limitations to the method of filling the organic porous ion exchange material in the deionizing chambers partitioned by the ion exchange membranes on the both sides. For example, a method of fabricating a porous ion exchange material with a shape conforming to the shape of the deionizing chambers and filling it in the deionizing chambers as is or a method of laminating divided layers of organic porous ion exchange material can be employed.

There are no specific limitations to the cation exchange membrane inasmuch as the membrane allows only cations to permeate and can isolate water on the both sides. A strong cation exchange membrane made from a fluoro resin matrix with $SO_3$ groups introduced therein (e.g. Nafion 117 and Nafion 350 manufactured by E.I. duPont de Nemours and Company) and a strong cation exchange membrane made from a styrene-divinylbenzene copolymer matrix with $SO_3$ groups introduced therein (e.g. Neosepta CMX manufactured by Tokuyama Corp.) can be cited as examples. There are no specific limitations to the anion exchange membrane inasmuch as the membrane allows only anions to permeate and can isolate water on the both sides. An anion exchange membrane made from a fluoro resin matrix with anionic groups introduced therein (e.g. TOSFLEX IE-SA, TOSFLEX IE-DF, TOSFLEX IE-SF manufactured by Tosoh Corp.) and an anion exchange membrane made from a styrene-divinylbenzene copolymer matrix with anionic groups introduced therein (e.g. Neosepta AMH manufactured by Tokuyama Corp.) can be given as examples. Either a cation exchange membrane or an anion exchange membrane can be used as the ion exchange membrane 17 for the electrodeionization deionized water producing apparatus 20a of this embodiment.

As the cathode 9 and anode 10, an electrode prepared by plating or coating a substrate made from a metal, alloy, or metal oxide or a conductive material such as sintered carbon, in the form of a plate, punching metal, mesh, or the like can be used. As the material for the anode 10, Pt, Pd, Ir, $\beta\text{-}PbO_2$, $NiFe_2O_4$, and the like are preferable due to their excellent acid resistance and oxidation resistance. As the material for the cathode 9, Pt, Pd, Au, carbon steel, stainless steel, Ag, Cu, graphite, vitreous carbon, and the like are preferable due to their excellent alkali resistance.

The electrodes and ion exchange membranes are preferably disposed directly in contact with each other for reducing the voltage during operation and decreasing power consumption. When causing the electrodes to directly come into contact with the ion exchange membranes, it is necessary to prevent deterioration of the ion exchange membranes due to strong acidic actions by using a fluoro resin matrix, particularly on the anode side. When using an ion exchange membrane other than one having a fluoro resin matrix, a nonconductor spacer such as a mesh made of the polyolefin in is preferably inserted between the electrode and ion exchange membrane for preventing direct contact of the electrode with the ion exchange membrane, thereby protecting the ion exchange membrane from deterioration. Even in the case of using on ion exchange membrane having a fluoro resin matrix as the ion exchange membrane, when the anion exchange membrane 2 with anion exchange groups such as quaternary ammonium groups introduced therein and an anode 10 are disposed on the anode side of deanionizing chamber 7, insertion of a nonconductor spacer such as a mesh made of the polyolefin between the anode 10 and the anion exchange membrane 2 is preferable for preventing oxidation of the anion exchange groups and protecting the ion exchange membrane from deterioration.

As the first and second feed water introduction-distribution sections 3a, 3b and the first and second treated water collecting sections 4a, 4b in the electrodeionization cationized water-producing apparatus 20a, a system of embedding distribution pipes and water-collecting pipes with small holes (pores) in the bed of the porous ion exchange material in the form of concentric circles or equally-spaced parallel lines conforming to the configuration of the deionizing chamber to allow a uniform flow of feed water in the deionizing chamber and a system of forming grooves in the feed water introduction-distribution sections and treated water collecting sections in the porous ion exchange material so that the porous ion exchange material itself may be provided with the functions of introducing/distributing feed water and collecting the treated water can be given, for example. Of these, the system of providing the porous ion exchange material with the functions of introducing/distributing feed water and collecting the treated water is preferable due to simple fabrication without separately providing piping materials.

In the electrodeionization deionized water producing apparatus 20A of this embodiment, the direct current may be caused to run independently through the decationizing chamber 6 and deanionizing chamber 7 by installing a separate power source in each chamber or may be caused to run through the decationizing chamber 6 and deanionizing chamber 7 connected in series by installing a single direct current power source. The method of causing electric current to run through the decationizing chamber 6 and deanionizing chamber 7 connected in series is not desirable, because each deionizing chamber generally has electric resistance differing from the other deionizing chamber so that the current running through one deionizing chamber differs from the current running through the other deionizing chamber, which may obstruct sufficient discharge of adsorbed ions.

As the method of causing the direct current to run in the electrodeionization deionized water producing apparatus 20A of this embodiment, a fixed current run in which the voltage automatically changes according to fluctuation of the electric resistance of the porous ion exchange material created by the variations of ion compositions and the like is preferable due to the efficient electric discharge of incoming ionic loadings. The required current is determined according to the amount of ions to be discharged, specifically, the quality and flow rate of feed water. In the case of intermittent operation, however, the required current varies according to the durations of water feeding and suspension, in addition to the quality and flow rate of feed water. It is difficult to determine the current applicable to all the cases since the required current varies according to various conditions. It is, however, safe to define the required current as a value obtained by adding a safety factor taking into account fluctuation of water quality and the like to the current efficiency factor of the electrodeionization deionized water producing apparatus, multiplied by the minimum current determined according to the following formula.

Minimum current required for decationizing chamber:

$$I_{min}(A) = McQF/(60^2 \times 10^3)$$

Minimum current required for deanionizing chamber:

$$I_{min}(A) = MaQF/(60^2 33 \; 10^3)$$

wherein Mc indicates the total cations (meq/l) in the feed water, Ma indicates the total anions (meq/l) in the feed water, Q is feed water feed rate (l/h), and F is a Faraday constant (C/mol) The current efficiency is a percentage of current used for exclusion of ions, which is 95 to 100% in the electrodeionization deionized water producing apparatus of the present invention.

Either continuous or intermittent operation can be applied to the electrodeionization deionized water producing apparatus 20A of this embodiment. The continuous operation may comprise, for example, continuous feeding of feed water and continuous current charge. In the intermittent operation, feed water feeding is suspended for a certain period of time. The direct current may be caused to run either only during suspension of feed water feeding or during both suspension and non-suspension.

In the electrodeionization decationized water-producing apparatus 20a, the feed water is introduced from the cathode 9 side of the decationizing chamber 6 and uniformly distributed in the porous cation exchange material 15 by the first feed water introduction-distribution section 3a. Then, the feed water moves in the porous cation exchange material 15 to the anode 10 side during which cations $X^+$ are removed by adsorption, whereby the feed water is converted into acidic soft water, which is collected in the first treated water collecting section 4a and discharged from the decationizing chamber 6 as the first treated water. Next, the acidic soft water is introduced to the anode 10 side in the deanionizing chamber 7 via the connecting pipe 5a and uniformly distributed in the porous anion exchange material 16 by the second feed water introduction-distribution section 3b. Then, the first treated water or the second feed water goes down through the porous anion exchange material 16 to the anode 10 side during which anions $Y^-$ are removed by adsorption, and collected in the second treated water collecting section 4b and discharged from the deanionizing chamber 7 as the second treated water.

On the other hand, the cations $X^+$ adsorbed on the organic porous cation exchange material 15 in the decationing chamber 6 are electrophoretically moved by the direct current running between the cathode 9 and anode 10 disposed at the ends of the decationizing chamber 6 respectively, pass through the cation exchange membrane 1 on the cathode 9 side, and are discharged to a cathode chamber 12. In the same manner, the anions $Y^-$ adsorbed on the organic porous anion exchange material 16 in the deanionizing chamber 7 are electrophoretically moved by the direct current running between the cathode 9 and anode 10 disposed at the ends of the deanionizing chamber 7 respectively, pass through the anion exchange membrane 2 on the anode 10 side, and are discharged to an anode chamber 13.

Impurity cations discharged to the cathode chamber 12 are entrained by electrode water flowing in from an electrode chamber entrance C and flowing out from an electrode chamber exit c, and discharged outside the system. In the same manner, impurity anions discharged to the anode chamber 13 are entrained by electrode water flowing in from an electrode chamber entrance D and flowing out from an electrode chamber exit d, and discharged outside the system. A part of feed water may be used as the electrode water. In this case, either the feed water may be branched to independently flow through the four electrode chambers or the feed water may flow through each of the anode water system and the cathode water system. The electrode water may continuously or intermittently flow.

This operation ensures the impurity ions adsorbed on the porous ion exchange material always to be distributed at a concentration higher on the feed water inlet side than that on the outlet side. For this reason, the porous ion exchange material in the neighborhood of the treated water collecting section 4 is maintained in an almost completely regenerated form and, therefore, can adsorb impurity ions in the feed water to a low concentration, ensuring high purity deionized water to be supplied to use points and the like. Since impurity cations and impurity anions are separately discharged outside the electrodeionization deionized water producing apparatus of the present invention, these are not mixed in the apparatus as in the conventional electrodeionization deionized water producing apparatus. Thus, scale formation in the apparatus can be prevented even if hardness components such as calcium and magnesium are included in the feed water.

As another method of feeding water to the electrodeionization deionized water producing apparatus 20A, a method of treating the feed water in the electrodeionization deanionized water-producing apparatus 20b, then treating the water from the electric anionized water-producing apparatus 20b in the electrodeionization decationized water-producing apparatus 20a, for example, can be given. This method can be applied to feed water which does not contain hardness components such as calcium and magnesium such as soft water. When treating water other than soft water, a reverse order of feed water feeding, specifically, from the decationizing chamber 6 to the deanionizing chamber 7 can prevent deposition of hardness components which may otherwise occur in the deanionizing chamber 7.

Figure 2:
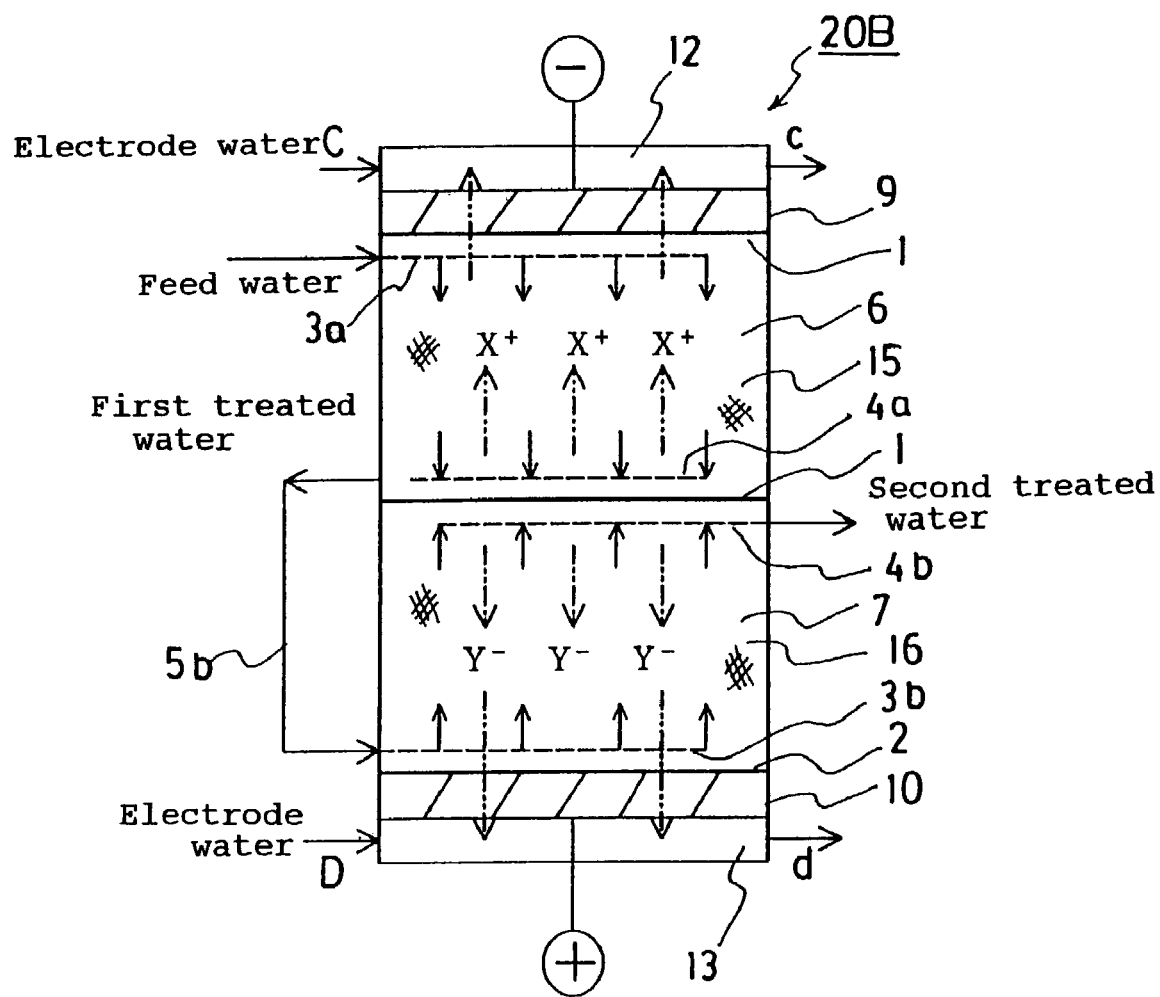
FIG. 2 is a schematic drawing showing a second embodiment of the electrodeionization deionized water producing apparatus of the present invention.

A second embodiment of the electrodeionization deionized water producing apparatus of the present invention will now be explained with reference to FIG. 2. FIG. 2 is a schematic drawing describing the structure of the electrodeionization deionized water producing apparatus of this second embodiment. In FIG. 2, the same symbols are given to the same components as in FIG. 1, for which the description is omitted, focusing the description on the components having different features. An electrodeionization deionized water producing apparatus 20B in FIG. 2 differs from the electrodeionization deionized water producing apparatus 20A in FIG. 1 in providing a decationizing chamber and a deanionizing chamber between a pair of electrodes by omitting another pair of electrodes. Specifically, the electrodeionization deionized water producing apparatus 20B of this second embodiment comprises a decationizing chamber 6 packed with an organic porous cation exchange material 15 in a first deionizing chamber partitioned by a cation exchange membrane 1 on one side and an intermediate cation exchange membrane 1 disposed between the cation exchange membrane 1 on the one side and an anion exchange membrane 2 on the other side, a deanionizing chamber 7 packed with an organic porous anion exchange material 16 in a second deionizing chamber partitioned by an anion exchange membrane 2 on the other side and the intermediate cation exchange membrane 1, a cathode 9 disposed outside the cation exchange membrane 1 on the one side, an anode 10 disposed outside the anion exchange membrane 2 on the other side, a first feed water introduction-distribution section 3a disposed in the neighborhood of the cation exchange membrane 1 on the one side in the decationizing chamber 6, a first treated water collecting section 4a disposed in the neighborhood of the intermediate cation exchange membrane 1 in the decationizing chamber 6, a second feed water introduction-distribution section 3b disposed in the neighborhood of the anion exchange membrane 2 on the other side in the deanionizing chamber 7 connected via a connection tube 5b with the first treated water collecting section 4a, and a second treated water collecting section 4b disposed in the neighborhood of the intermediate cation exchange membrane 1 in the deanionizing chamber 7.

In the same manner as in the electrodeionization deionized water producing apparatus 20A, in the electrodeionization deionized water producing apparatus 20B, the feed water is introduced from the cathode 9 side of the decationizing chamber 6 and uniformly distributed in the porous cation exchange material 15 by the first feed water introduction-distribution section 3a. Then, the feed water goes down through the porous cation exchange material 15 to the intermediate cation exchange membrane 1 side during which cations $X^+$ are removed by adsorption, whereby the feed water is converted into acidic soft water, which is collected in the first treated water collecting section 4a and discharged from the decationizing chamber 6 as the first treated water. Next, the first treated water is introduced to the anode 10 side in the deanionizing chamber 7 via connecting pipe 5b and uniformly distributed in the porous anion exchange material 16 by the second feed water introduction-distribution section 3b. Then, the first processed Feed water here moves in the porous anion exchange material 16 to the intermediate anode exchange membrane 1 side during which cations $Y^-$ are removed by adsorption, and collected in the second treated water collecting section 4b and discharged from the deanionizing chamber 7 as the second treated water.

On the other hand, cations $X^+$ adsorbed on the porous cation exchange material 15 in the decationizing chamber 6 are electrophoretically moved by the direct current running between the cathode 9 and anode 10 disposed at the ends of the apparatus 20B respectively, pass through the cation exchange membrane 1 on the cathode 9 side, and are discharged to the cathode chamber 12. In the same manner, anions $Y^-$ adsorbed on the porous anion exchange material 16 in the deaninizing chamber 7 are electrophoretically moved by the direct current running between the cathode 9 and anode 10, pass through the anion exchange membrane 2 on the anode 10 side, and are discharged to the anode chamber 13. In addition to the effects exhibited by the electrodeionization deionized water producing apparatus 20A in the first embodiment, the electrodeionization deionized water producing apparatus 20B in the second embodiment has the effect of downsizing and simplifying the apparatus by omitting a pair of electrodes.

Figure 3:
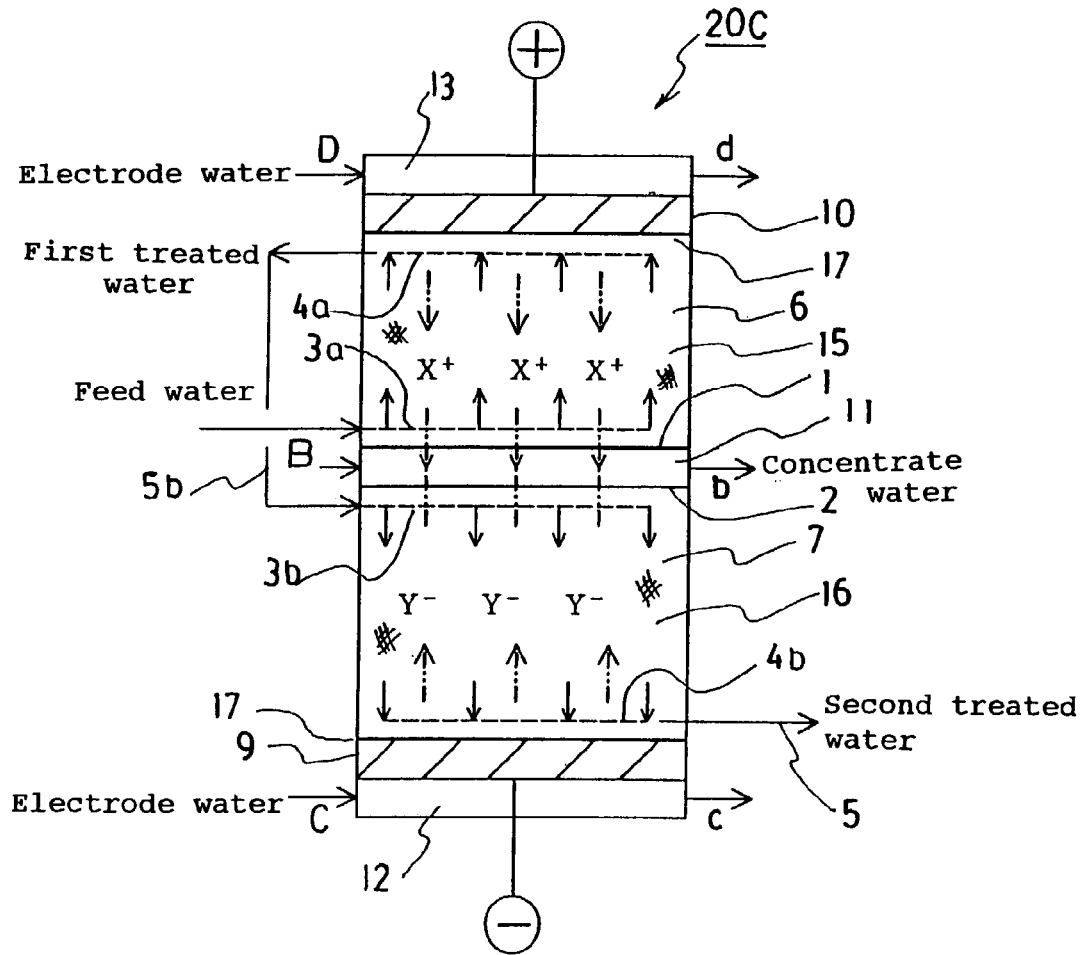
FIG. 3 is a schematic drawing showing a third embodiment of the electrodeionization deionized water producing apparatus of the present invention.

The electrodeionization deionized water producing apparatus of a third embodiment of the present invention will now be explained with reference to FIG. 3. FIG. 3 is a schematic drawing describing the structure of the electrodeionization deionized water producing apparatus of this third embodiment. In FIG. 3, the same symbols are given to the same components as in FIG. 1, for which the description is omitted, focusing the description on the components having different features. An electrodeionization deionized water producing apparatus 20C in FIG. 3 differs from the apparatus 20A in FIG. 1 in providing a decationizing chamber and a deanionizing chamber between a pair of electrodes by omitting another pair of electrodes and in providing a structure of collecting ions to be discharged in a concentrate chamber installed in the center. Specifically, the electrodeionization deionized water producing apparatus 20C of this embodiment comprises a decationizing chamber 6 packed with an organic porous cation exchange material 15 in a first deionizing chamber partitioned by an ion exchange membrane 17 on one side and an intermediate cation exchange membrane 1 disposed between the ion exchange membrane 17 on the one side and an ion exchange membrane 17 on the other side, a concentrate chamber 11 partitioned by the intermediate cation exchange membrane 1 and an intermediate anion exchange membrane 2 disposed between the intermediate cation exchange membrane 1 and the ion exchange membrane 17 on the other side, a deanionizing chamber 7 packed with an organic porous anion exchange material 16 in a second deionizing chamber partitioned by the ion exchange membrane 17 on the other side and the intermediate anion exchange membrane 2, an anode 10 disposed outside the ion exchange membrane 17 on the one side, a cathode 9 disposed outside the ion exchange membrane 17 on the other side, a first feed water introduction-distribution section 3a disposed in the neighborhood of the intermediate cation exchange membrane 1 in the decationizing chamber 6, a first treated water collecting section 4a disposed in the neighborhood of the ion exchange membrane 17 on the one side in the decationizing chamber 6, a second feed water introduction-distribution section 3b disposed in the neighborhood of the intermediate anion exchange membrane 2 in the deanionizing chamber 7 connected via a connection tube 5b with the first treated water collecting section 3b, and a second treated water collecting section 4b disposed in the neighborhood of the ion exchange membrane 17 on the other side in the deanionizing chamber 7.

In the electrodeionization deionized water producing apparatus 20C, the feed water flows in the decationizing chamber 6 from the concentrate chamber 11 side in the center to the anode 10 side, and cations $X^+$ to be discharged flow in the opposing direction. In the deanionizing chamber 7, on the other hand, the feed water flows from the concentrate chamber 11 side in the center to the cathode 9 side, and anions $Y^-$ to be discharged flow in the opposing direction. Impurity ions flowing in a concentrate chamber 11 enter from the concentrate chamber entrance B, are entrained by concentrate water flowing out from concentrate chamber exit b, and discharged outside the system. A part of feed water, for example, can be used as the concentration water flowing in the concentrate chamber 11. The same effect as that exhibited by the electrodeionization deionized water producing apparatus 20B can be obtained using the electrodeionization deionized water producing apparatus 20C. However, scale may be formed on the surface of the anion exchange membrane 2 in the concentrate chamber 11, since cations such as calcium ion and magnesium ion are mixed with anions such as carbonate ion in the concentrate chamber 11. Therefore, it is desirable to provide a pretreatment means such as a softening process or primary desalting process on the front end of the electrodeionization deionized water producing apparatus 20C.

In the electrodeionization deionized water producing apparatus of the present invention, a small amount of gases such as oxygen and chlorine are formed in the anode and a small amount of gases such as hydrogen are formed in the cathode by electrode reactions. For this reason, a liquid-gas separation means and an exhaust gas pipe are provided in each electrode chamber or electrode water pipe to ensure discharge of produced gases continuously or intermittently. Gases are discharged outside the system after appropriate treatment depending upon the nature of the gas. Metals such as calcium may also deposit, particularly, in the cathode due to the electrode reactions. In this instance, it is suitable to maintain the electrode functions by a method of reversing the polarity of the electrodes at given intervals, a method of washing the electrodes with an acid by feeding an aqueous solution such as a nitric acid solution or sulfuric acid solution with a concentration of about 1 mol/L through electrode water pipes, or a method combining these methods.

Applications and combinations applied to the conventional ion exchange apparatus are also applicable to the electrodeionization deionized water producing apparatus of the present invention. For example, the apparatus can be used as a softening apparatus by using only the decationizing chamber, or a mixed bed ion exchanger may be installed downstream to increase purity of the treated water.

EXAMPLES

The present invention will be described in more detail by examples, which should not be construed as limiting the present invention.

(Preparation of Porous Cation Exchange Material)

Styrene (83.1 g), divinylbenzene (20.7 g), azobisisobutyronitrile (0.42 g), and sorbitan monooleate (11.4 g) were mixed and homogeneously dissolved. The mixture of styrene, divinylbenzene, azobisisobutyronitrile, and sorbitan monooleate was added to, deionized water (1,350 mL) and stirred in a homogenizer for 2 minutes at 20,000 rpm to obtain a w/o-type emulsion. After the emulsification, the w/o-type emulsion was put into an autoclave made of stainless steel. Air in the autoclave was sufficiently replaced with nitrogen and the autoclave sealed. The emulsion was allowed to stand to polymerize at 60° C. for 24 hours. After the polymerization, the reaction mixture was extracted with isopropanol for 24 hours using a Soxhlet extractor to remove unreacted monomers and sorbitan monooleate, and dried overnight at 40° C. under reduced pressure. Tetrachloroethane (1,500 g) was added to the composite porous material of styrene-divinylbenzene copolymer (containing 14 mol % of crosslinking components) thus obtained. The mixture was heated at 60° C. for 30 minutes. After cooling to room temperature, chlorosulfuric acid (75 g) was gradually added and the mixture was reacted at room temperature for 24 hours. After the reaction, acetic acid was added and the mixture was poured into a large amount of water, washed with water, and dried to obtain a porous cation exchanger. The ion exchange capacity of the porous material was 4.0 meq./g on a dry basis. Sulfur atom mapping by EPMA confirmed that the porous material contained sulfonic acid groups uniformly dispersed therein. Inspection with SEM confirmed that the internal structure of the porous material has a continuous pore structure, in which the majority of macropores having a median diameter of 30 μm are layered and mesopores formed by the layered macropores have a median diameter of 5 μm. The total pore volume was 10.1 ml/g.

(Preparation of Porous Anion Exchange Material)

A porous material of p-chloromethylstyrene-divinylbenzene copolymer (containing 50 mol % of crosslinking components) was prepared by polymerizing the w/o-type emulsion in the same manner as in the preparation of the above porous cation exchange material, except that p-chloromethylstyrene (54.0 g) was used instead of styrene (83.1 g), and a different amount was used for divinylbenzene (51.9 g) and azobisisobutylonitrile (0.78 g). Dioxane (1,500 g) was added to the porous material and the mixture was heated at 80° C. for 30 minutes. After cooling to room temperature, an aqueous solution (195 g) of 30% trimethylamine was gradually added. The mixture was reacted for 3 hours at 50° C. and then allowed to stand over night at room temperature. After the reaction, the porous material was washed with acetone, then with water, and dried to obtain a porous anion exchanger. The ion exchange capacity of the porous material was 2.5 meq./g on a dry basis. SIMS analysis confirmed that the porous material contained trimethylammonium groups uniformly dispersed therein. Inspection with SEM confirmed that the internal structure of the porous material has a continuous pore structure, in which the majority of macropores having a median diameter of 30 μm are layered and mesopores formed by layered macropores have a median diameter of 4 μm. The total pore volume was 9.9 mL/g.

(Fabrication of Electrodeionization Decationized Water-Producing Apparatus)

Figure 4:
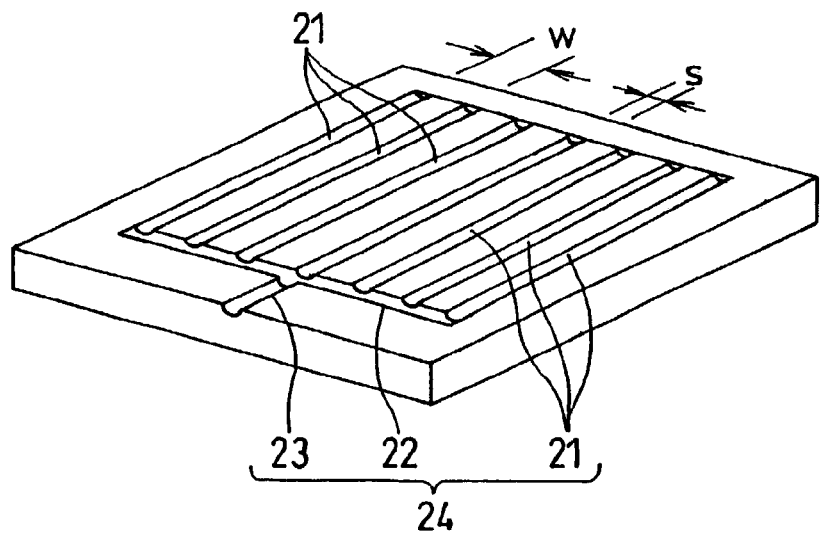
FIG. 4 is a drawing showing grooves on the surface of the porous ion exchange material functioning as a feed water introduction-distribution section or treated water collecting section.
Figure 5:
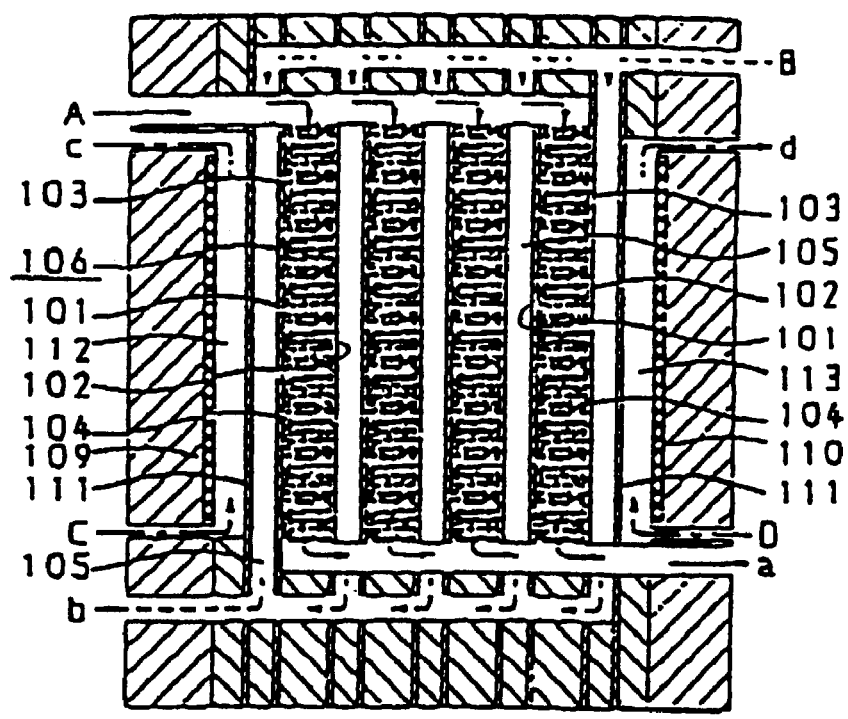
FIG. 5 is a schematic sectional view of a conventional electrodeionization deionized water producing apparatus.
Figure 6:
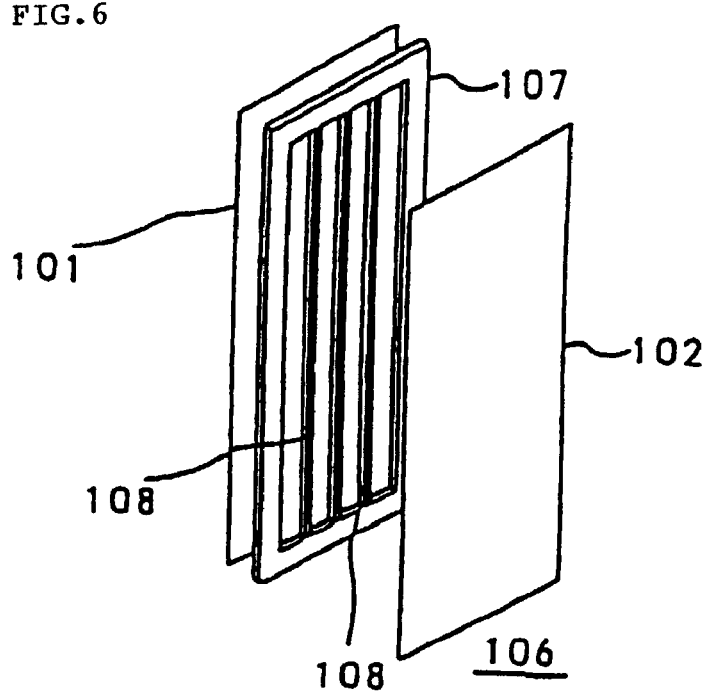
FIG. 6 is an assembling chart for a deionizing module used in the conventional electrodeionization deionized water producing apparatus.

For fabricating an electrodeionization deionized water producing apparatus 20A shown in FIG. 1, an electrodeionization decationized water-producing apparatus 20a was first fabricated. Five cuboids each with a dimension of a length of 100 mm, width of 100 mm, and thickness of 10 mm and two cuboids each with a dimension of a length of 100 mm, width of 100 mm, and thickness of 5 mm, both on a wet basis, were cut from the porous cation exchange material prepared as described above for use as packing materials to be filled in layer in the deionizing chamber. A plurality of lengthwise grooves 21 with a width (s) of 2 mm at intervals (w) of 10 mm, as shown in FIG. 4, a side groove 22 connecting one end of the grooves 21, and an introduction groove 23 connecting the side grooves 22 with an outside pipe (not shown) were formed on one side of two of said packing cuboids with a thickness of 5 mm and two of said packing cuboids with a thickness of 10 mm by cutting. Then, these packing cuboids were layered in such a manner that the cuboids with a thickness of 5 mm are disposed on the top and bottom so that the grooves 24 may face inside the apparatus and the five cuboids with a thickness of 10 mm are layered between the cuboids on the top and bottom. In this instance, among the cuboids with a thickness of 10 mm, the uppermost one and lowermost one were disposed so that their grooves 24 may face with the grooves 24 of the cuboids with a thickness of 5 mm. A feed water introduction-distribution section 3 and a treated water collecting section 4 were formed in this manner. A blocked porous cation exchange material 15 fabricated in this manner has a length of 100 mm, width of 100 mm, and a total height of layered packing materials of 60 mm. The height from the center of the feed water introduction-distribution section 3 to the center of the treated water collecting section 4, specifically, the height of effective ion exchange material layer, was 50 mm. A cation exchange membrane (Nafion 350, manufactured by E.I. du Pont de Nemours and Company) was sealingly attached to the other side of the blocked porous cation exchange material 15 and a cation exchange membrane (Nafion 350, manufactured by E.I. du Pont de Nemours and Company) was sealingly attached to the one side. Furthermore, a platinum mesh anode 10 was arranged on the outer surface of the cation exchange membrane and a platinum mesh cathode 9 was arranged on the outer surface of the cation exchange membrane. The resulting structure was built in a housing of polyvinyl chloride appropriately equipped with nozzles and ports for lead wires, thereby fabricating the electrodeionization decationized water-producing apparatus 20a.

(Fabrication of Electric Deanionized Water-Producing Apparatus)

Packing cuboids were obtained in the same manner as above using the resulting porous anion exchange material. Then, a feed water introduction-distribution section 3b and a treated water collecting section 4b were formed to obtain a blocked anion exchange material 16. An anion exchange membrane 2 (Neosepta AMH, manufactured by Tokuyama Corp.) was sealingly attached to one side of the blocked porous anion exchange material 16 and a cation exchange membrane (Nafion 350, manufactured by E.I. du Pont de Nemours and Company) was sealingly attached to the other side. Furthermore, a platinum mesh anode 10 was arranged on the outer surface of the anion exchange membrane 2 and a platinum mesh cathode 9 was arranged on the outer surface of the cation exchange membrane. In addition, a mesh made of polytetrafluoroethylene was inserted between the anode 10 and the anion exchange membrane 2. The resulting structure was built in a housing of polyvinyl chloride appropriately equipped with nozzles and ports for lead wires, thereby fabricating an electrodeionization deanionized water-producing apparatus 20b.

(Fabrication of Electrodeionization Deanionized Water-Producing Apparatus)

The opening of the treated water collecting section 4a in the obtained electric decationized water-producing apparatus 20a was connected with the opening of the feed water introduction-distribution section 3b in the obtained electrodeionization deanionized water-producing apparatus 20b using a connection pipe 5a so that a part of the feed water may be independently supplied to four electrode chambers. Using one direct current source as a power supply, the decationizing chamber and deanionizing chamber are connected with wire in series to obtain an electrodeionization deionized water producing apparatus 20A.

(Operation of Electrodeionization Deanionized Water Producing Apparatus)

City water having a conductivity of 120 µS/cm was continuously supplied at a flow rate of 100 l/hr to the electrodeionization deionized water producing apparatus 20A while applying a 4.5 A direct current. Treated water having a conductivity of 0.1 µS/cm was obtained at an operating voltage of 36V, demonstrating that high purity water can be produced by the electrodeionization deionized water producing apparatus of the present invention.

(Effect of the Invention)

Because the electrodeionization deionized water producing apparatus of the present invention employs an organic porous ion exchange material having a three-dimensional network structure as a filler for deionizing chambers and apply an electric field so that ions to be discharged are electrophoretically moved in the direction reverse to the direction of water flow in the deionizing chambers, the structure of the apparatus can be simplified and the costs for the raw materials, fabrication, and assembly can be reduced. In addition, since scale such as calcium carbonate or magnesium hydroxide is not formed, a pretreatment operation such as a primary desalting process or a softening process is unnecessary. The electrodeionization deionized water producing apparatus thus can reduce the cost for producing the treated water.

What is claimed is:

1. An electrodeionization deionized water producing apparatus having a deionizing chamber packed with an organic porous ion exchange material having a continuous pore structure comprising interconnected macropores and mesopores with a median diameter of 1 to 1000 µm existing on the walls of the macropores, the organic porous ion exchange material having a total pore volume of 1 to 50 mL/g, uniformly distributed ion exchanging groups, and an ion exchange capacity of 0.5 meq./g or more on a dry basis, wherein deionized water is produced by eliminating ionic impurities in water by passing water through the deionizing chamber and, at the same time, the ionic impurities adsorbed in the organic porous ion exchange material is discharged outside the system by applying a direct electric current to the deionizing chamber, the electrodeionization deionized water producing apparatus being characterized by applying the direct electric current so that the ions to be discharged are electrophoretically moved in the direction reverse to the flow of water through the organic porous ion exchange material.

2. The electrodeionization deionized water producing apparatus according to claim 1, wherein the ion exchange capacity of the organic porous ion exchange material is 2.0 meq./g or more on dry porous material.

3. An electrodeionization deionized water producing apparatus comprising: an electrodeionization decationized water producing apparatus comprising a decationizing chamber packed with an organic porous cation exchange material in a deionizing chamber partitioned by an ion exchange membrane on one side and a cation exchange membrane on the other side, an anode disposed outside the ion exchange membrane on the one side, a cathode disposed outside the cation exchange membrane on the other side, a first feed water introduction-distribution section disposed in the neighborhood of the cation exchange membrane on the other side in the decationizing chamber, and a first treated water collecting section disposed in the neighborhood of the ion exchange membrane on the one side in the decationizing chamber; and an electrodeionization deanionizing water-producing apparatus comprising a deanionizing chamber packed with an organic porous anion exchange material in a deionizing chamber partitioned by an anion exchange membrane on one side and an ion exchange membrane on the other side, an anode disposed outside the anion exchange membrane on the one side, a cathode disposed outside the ion exchange membrane on the other side, a second feed water introduction-distribution section disposed in the neighborhood of the anion exchange membrane on the one side in the deanionizing chamber and connected with a connection tube with the first treated water collecting section of the electrodeionization decationizing water-producing apparatus, and a second treated water collecting section disposed in the neighborhood of the ion exchange membrane on the other side in the deanionizing chamber.

4. The electrodeionization deionized water producing apparatus according to claim 3, wherein the effective thickness of the porous ion exchange material layers forming the decationzing chamber or deanionzing chamber is 20 to 600 mm.

5. The electrodeionization deionized water producing apparatus according to claim 3, wherein a nonconductor spacer is inserted between the electrode and the ion exchange membrane.

6. The electrodeionization deionized water producing apparatus according to claim 3, wherein the first feed water introduction-distribution section and the first treated water collecting section are provided in the organic porous cation exchange material by forming grooves in the feed water introduction-distribution section and the treated water collecting section of the organic porous cation exchange material, and the second feed water introduction-distribution section and the second treated water collecting section are provided in the organic porous anion exchange material by forming grooves in the feed water introduction-distribution section and the processed water collecting section of the organic porous anion exchange material.

7. The electrodeionization deionized water producing apparatus according to claim 3, wherein said organic porous cation exchange material or organic porous anion exchange material has a continuous pore structure, which comprises interconnected macropores and mesopores with a median diameter of 1 to 1,000 μm existing on the walls of the macropores and has a total pore volume of 1 to 50 mL/g, uniformly distributed ion exchanging groups, and an ion exchange capacity of 0.5 meq./g or more on a dry basis.

8. An electrodeionization deionized water producing apparatus comprising: a decationizing chamber packed with an organic porous cation exchange material in a first deionizing chamber partitioned by a cation exchange membrane on one side and an intermediate cation exchange membrane disposed between the cation exchange membrane on one side and an anion exchange membrane on the other side, a deanionizing chamber packed with an organic porous anion exchange material in a second deionizing chamber partitioned by the anion exchange membrane on the other side and the intermediate cation exchange membrane, a cathode disposed outside the cation exchange membrane on the one side, an anode disposed outside the anion exchange membrane on the other side, a first feed water introduction-distribution section disposed in the neighborhood of the cation exchange membrane on the one side in the decationizing chamber, a first treated water collecting section disposed in the neighborhood of the intermediate cation exchange membrane in the decationizing chamber, a second feed water introduction-distribution section disposed in the neighborhood of the anion exchange membrane on the other side in the deanionizing chamber and connected via a connection tube with the first treated water collecting section, and a second treated water collecting section disposed in the neighborhood of the intermediate cation exchange membrane in the deanionizing chamber.

9. The electrodeionization deionized water producing apparatus according to claim 8, wherein the effective thickness of the porous ion exchange material layers forming the decationzing chamber or deanionzing chamber is 20 to 600 mm.

10. The electrodeionization deionized water producing apparatus according to claim 8, wherein a nonconductor spacer is inserted between the electrode and the ion exchange membrane.

11. The electrodeionization deionized water producing apparatus according to claim 8, wherein the first feed water introduction-distribution section and the first treated water collecting section are provided in the organic porous cation exchange material by forming grooves in the feed water introduction-distribution section and the treated water collecting section of the organic porous cation exchange material, and the second feed water introduction-distribution section and the second treated water collecting section are provided in the organic porous anion exchange material by forming grooves in the feed water introduction-distribution section and the treated water collecting section of the organic porous anion exchange material.

12. The electrodeionization deionized water producing apparatus according to claim 8, wherein said organic porous cation exchange material or organic porous anion exchange material has a continuous pore structure, which comprises interconnected macropores and mesopores with a median diameter of 1 to 1,000 μm existing on the walls of the macropores, a total pore volume of 1 to 50 mL/g, uniformly distributed ion exchanging groups, and an ion exchanging capacity of 0.5 meq./g or more on a dry basis.

13. An electrodeionization deionized water producing apparatus comprising: a decationizing chamber packed with an organic porous cation exchange material in a first deionizing chamber partitioned by an ion exchange membrane on one side and an intermediate cation exchange membrane disposed between the ion exchange membrane on the one side and an ion exchange membrane on the other side, a concentrate chamber partitioned by the intermediate cation exchange membrane and an intermediate anion exchange membrane disposed between the intermediate cation exchange membrane and the ion exchange membrane on the other side, a deanionizing chamber packed with an organic porous anion exchange material in a second deionizing chamber partitioned by the ion exchange membrane on the other side and the intermediate anion exchange membrane, an anode disposed outside the ion exchange membrane on the one side, a cathode disposed outside the ion exchange membrane on the other side, a first feed water introduction-distribution section disposed in the neighborhood of the intermediate cation exchange membrane in the decationizing chamber, a first treated water collecting section disposed in the neighborhood of the ion exchange membrane on the one side in the decationizing chamber, a second feed water introduction-distribution section disposed in the neighborhood of the intermediate anion exchange membrane in the deanionizing chamber and connected via a connection tube with the first treated water collecting section, and a second treated water collecting section disposed in the neighborhood of the ion exchange membrane on the other side in the deanionizing chamber.

14. The electrodeionization deionized water producing apparatus according to claim 13, wherein the effective thickness of the porous ion exchange material layers forming the decationzing chamber or deanionzing chamber is 20 to 600 mm.

15. The electrodeionization deionized water producing apparatus according to claim 13, wherein a nonconductor spacer is inserted between the electrode and the ion exchange membrane.

16. The electrodeionization deionized water producing apparatus according to claim 13, wherein the first feed water introduction-distribution section and the first treated water collecting section are provided in the organic porous cation exchange material by forming grooves in the feed water introduction-distribution section and the treated water collecting section of the organic porous cation exchange material respectively, and the second feed water introduction-distribution section and the second treated water collecting section are provided in the organic porous anion exchange material by forming grooves in the feed water introduction-distribution section and the treated water collecting section of the organic porous anion exchange material, respectively.

17. The electrodeionization deionized water producing apparatus according to claim 13, wherein said organic porous cation exchange material or organic porous anion exchange material has a continuous pore structure, which comprises interconnected macropores and mesopores with a median diameter of 1 to 1,000 μm existing on the walls of the macropores, a total pore volume of 1 to 50 ml/g, uniformly distributed ion exchanging groups, and an ion exchanging capacity of 0.5 meq./g or more on a dry basis.

* * * * *